United States Patent
Fujimoto et al.

(10) Patent No.: US 12,498,697 B2
(45) Date of Patent: Dec. 16, 2025

(54) NUMERICAL CONTROL DEVICE (71) Applicant: FANUC CORPORATION, Yamanashi (JP)

(72) Inventors: Hiroyuki Fujimoto, Yamanashi (JP); Nobuaki Aizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 392 days.

(21) Appl. No.: 18/043,533

(22) PCT Filed: Sep. 9, 2021

(86) PCT No.: PCT/JP2021/033141
§ 371 (c)(1),
(2) Date: Feb. 28, 2023

(87) PCT Pub. No.: WO2022/059587
PCT Pub. Date: Mar. 24, 2022

(65) Prior Publication Data
US 2023/0266739 A1  Aug. 24, 2023

(30) Foreign Application Priority Data
Sep. 15, 2020 (JP) .................. 2020-154558

(51) Int. Cl.
*G05B 19/4093* (2006.01)
(52) U.S. Cl.
CPC .............. *G05B 19/40937* (2013.01)
(58) Field of Classification Search
None
See application file for complete search history.

(56) References Cited

U.S. PATENT DOCUMENTS

| | | | | |
|---|---|---|---|---|
| 4,704,687 A | * | 11/1987 | Kishi | G05B 19/40937 700/190 |
| 5,289,383 A | * | 2/1994 | Sawamura | G05B 19/41 700/187 |
| 5,815,400 A | * | 9/1998 | Hirai | G05B 19/401 700/184 |
| 9,829,879 B2 | * | 11/2017 | Tanuma | G05B 19/402 |
| 10,261,495 B2 | * | 4/2019 | Ishii | G05B 19/4065 |
| 11,654,522 B2 | * | 5/2023 | Liao | G05B 19/406 29/407.01 |

(Continued)

FOREIGN PATENT DOCUMENTS

| | | |
|---|---|---|
| CN | 101602130 A | 12/2009 |
| CN | 102870055 A | 1/2013 |

(Continued)

OTHER PUBLICATIONS

International Search Report issued in PCT/JP2021/033141; mailed Nov. 16, 2021.

*Primary Examiner* — Jason Lin
(74) *Attorney, Agent, or Firm* — Studebaker Brackett PLLC (57) ABSTRACT

The purpose is to provide a numerical control device that can easily suppress the occurrence of burrs. The numerical control device comprises: an analysis unit that analyses a processing program for processing a workpiece in a machine tool; and a corner specifying unit that specifies the corner that causes burrs on the workpiece based on the analyzed processing program.

6 Claims, 10 Drawing Sheets

WHEN WORKPIECE IS ON A SIDE

PROTRUDING CORNER PART

RECESSED CORNER PART (56) References Cited

U.S. PATENT DOCUMENTS

| 11,883,973 | B2 * | 1/2024 | Shamoto | ............... | B26D 5/005 |
| 2007/0016325 | A1 * | 1/2007 | Esterling | ............ | G05B 19/4065 |
| | | | | | 700/175 |
| 2008/0215174 | A1 * | 9/2008 | Kanai | ..................... | G06F 30/00 |
| | | | | | 700/98 |

FOREIGN PATENT DOCUMENTS

| CN | 103028846 A | 4/2013 | |
| CN | 104681474 A | 6/2015 | |
| CN | 106681276 A | 5/2017 | |
| JP | H03-224004 A | 10/1991 | |
| JP | 2010-092142 A | 4/2010 | |
| JP | 5156570 B2 * | 3/2013 | ....... G05B 19/40931 |
| JP | 2013-103316 A | 5/2013 | |
| JP | 2013-117924 A | 6/2013 | |
| JP | 2018-005423 A | 1/2018 | |
| JP | 2019-082851 A | 5/2019 | |
| WO | 2015/114734 A1 | 8/2015 | |

* cited by examiner

WHEN WORKPIECE IS ON A SIDE

WORKPIECE IS ON A SIDE

→ COMMAND PATH

FIG. 5C

WORKPIECE IS ON B SIDE

→ COMMAND PATH

WORKPIECE IS ON A SIDE

FIG. 6C

WORKPIECE IS ON B SIDE

FIG. 7

NUMERICAL CONTROL DEVICE

TECHNICAL FIELD

The present invention relates to a numerical control apparatus.

BACKGROUND ART

Conventionally, it has been necessary to, since burrs occur on protruding corner parts of a machined workpiece, remove the burrs in a post-process. Therefore, a method for removing burrs formed on protruding corner parts of a workpiece has been proposed (see, for example, Patent Document 1).

Further, in order to prevent occurrence of burrs, addition of a machining path for performing chamfering to a machining program corresponding to positions where burrs occur, and the like are performed.

Patent Document 1: PCT International Publication No. WO2015/114734

DISCLOSURE OF THE INVENTION

Problems to be Solved by the Invention

However, though it is possible to prevent occurrence of burrs by adding a machining path for performing chamfering to a machining program, it takes much time to modify the machining program. Therefore, a numerical control apparatus capable of easily preventing occurrence of burrs is desired.

Means for Solving the Problems

A numerical control apparatus according to the present disclosure includes: an analysis unit analyzing a machining program for machining a workpiece in a machine tool; and a protruding corner part identification unit identifying a protruding corner part that causes burrs to occur on the workpiece, based on the analyzed machining program.

Effects of the Invention

According to the present invention, it is possible to easily prevent occurrence of burrs.

PREFERRED MODE FOR CARRYING OUT THE INVENTION

Figure 1:
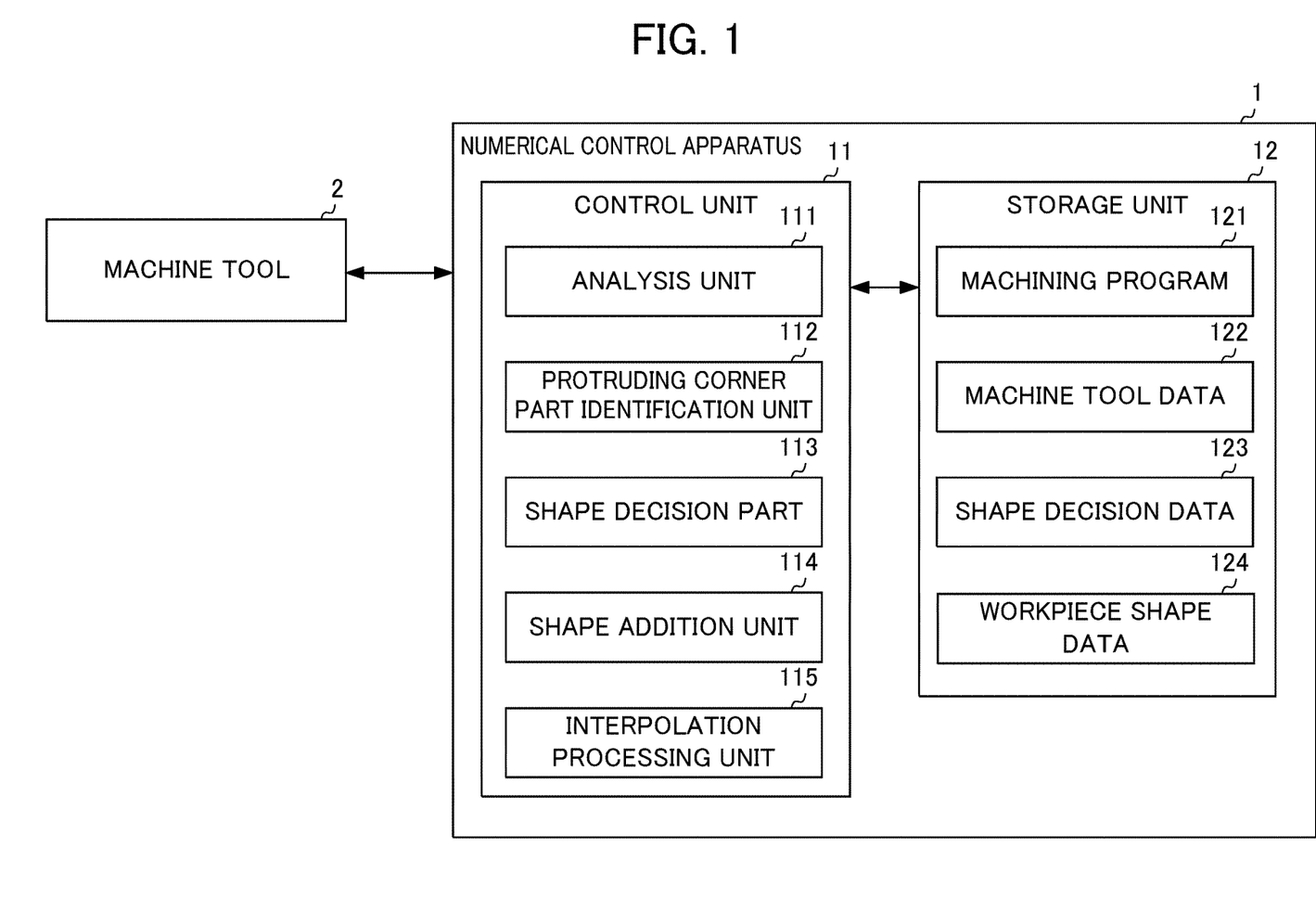
FIG. 1 is a diagram showing configurations of a numerical control apparatus and a machine tool.

An example of an embodiment of the present invention will be described below. FIG. 1 is a diagram showing configurations of a numerical control apparatus 1 and a machine tool 2. The numerical control apparatus 1 and the machine tool 2 are connected via a bus (not shown) or the like, and the machine tool 2 operates in accordance with control by the numerical control apparatus 1. Specifically, the machine tool 2 machines a workpiece in accordance with control by the numerical control apparatus 1. Though the configuration of the machine tool 2 is omitted for the purpose of simplification of description in the present specification, the machine tool 2 has a configuration of a general machine tool.

As shown in FIG. 1, the numerical control apparatus 1 is provided with a control unit 11 and a storage unit 12. The control unit 11 is a processor such as a CPU (central processing unit) and realizes various kinds of functions by executing a program stored in the storage unit 12.

The control unit 11 is provided with an analysis unit 111, a protruding corner part identification unit 112, a shape decision unit 113, a shape addition unit 114 and an interpolation processing unit 115.

The storage unit 12 is configured with a ROM (read-only memory), a RAM (random access memory), a nonvolatile memory, a hard disk drive and the like and stores various kinds of data. For example, the storage unit 12 stores a machining program 121 to be described later, tool data 122, added shape data 123, workpiece shape data 124 and the like.

The analysis unit 111 analyzes the machining program 121 for machining a workpiece by the machine tool 2. The protruding corner part identification unit 112 identifies a protruding corner part that causes burrs to occur on the workpiece based on the analyzed machining program 121.

The shape addition unit 114 adds a curvilinear (chamfer-shaped) path for the protruding corner part identified by the protruding corner part identification unit 112. Specifically, the shape addition unit 114 adds the curvilinear (chamfer-shaped) command path to a command path corresponding to the protruding corner part identified by the protruding corner part identification unit 112, on a command path of the machining program.

The interpolation processing unit 115 interpolates the command path to which the curvilinear (chamfer-shaped) command path has been added, to the command path of the machining program.

Then, the machine tool 2 operates on the path for which the interpolation processing by the interpolation processing unit 115 has been performed and machines the workpiece.

Figure 2A:
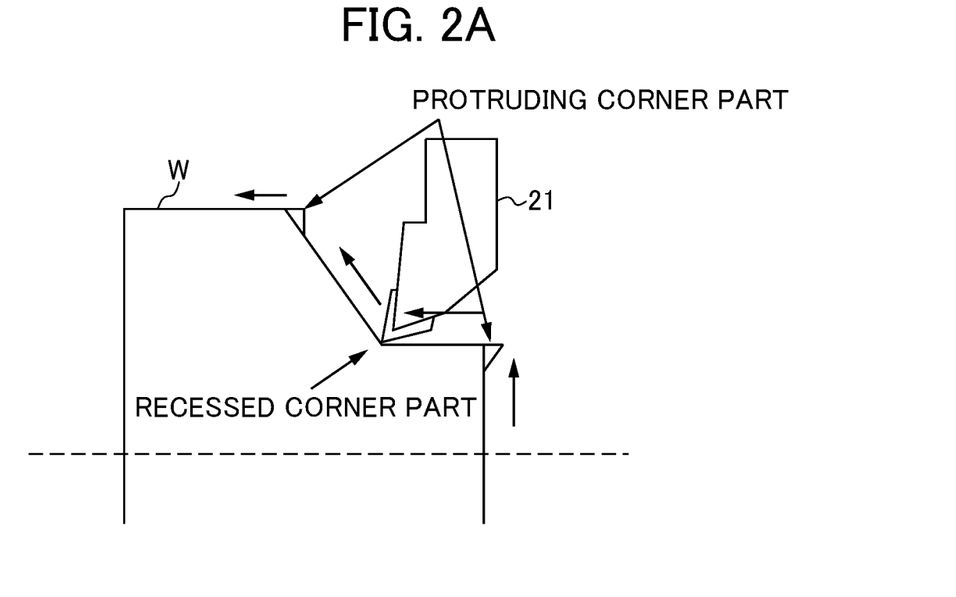
FIG. 2A is a diagram showing an example of machining a workpiece by a tool of the machine tool.
Figure 2B:
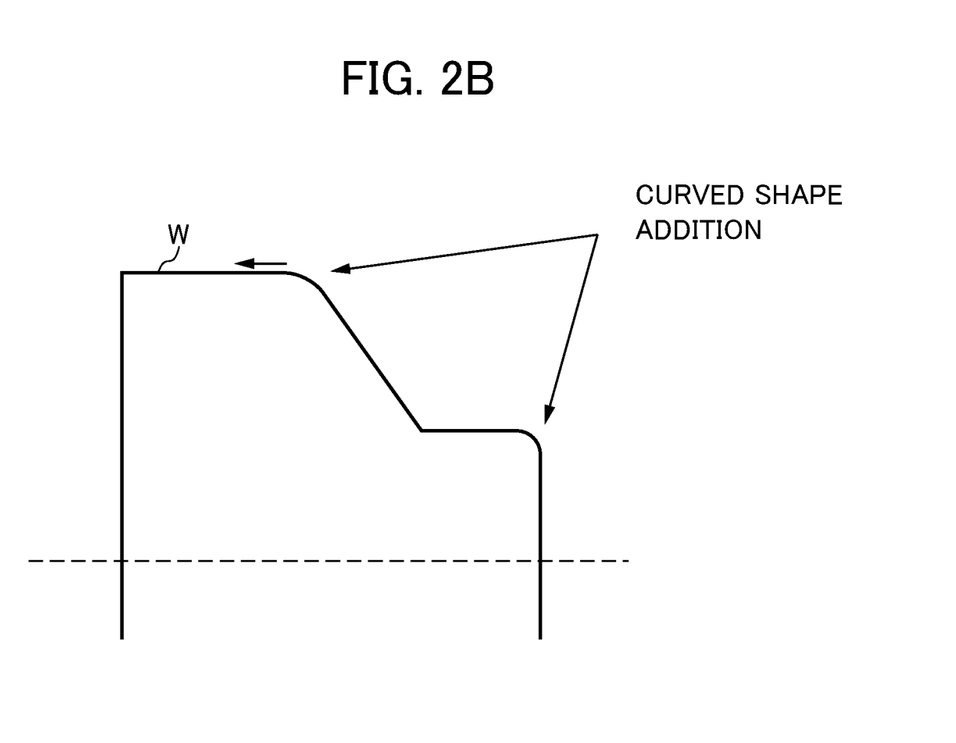
FIG. 2B is a diagram showing the example of machining the workpiece by the tool of the machine tool.

FIGS. 2A and 2B are diagrams showing an example of machining a workpiece W by a tool 21 of the machine tool 2. As shown in FIG. 2A, the workpiece W has protruding corner parts and a recessed corner part when machining of the workpiece W by the tool 21 is performed. The protruding corner parts are parts protruding toward the tool 21 side on the workpiece W, and the recessed corner part is a part recessed from the tool 21 side on the workpiece W.

On the workpiece W as above, the recessed corner part does not cause burrs to occur when being machined by the tool 21, but burrs occur on the protruding corner parts.

Therefore, as shown in FIG. 2B, the numerical control apparatus 1 according to the present embodiment identifies the protruding corner parts that cause burrs to occur on the workpiece W and adds such minute curvilinear paths that do not influence the shape accuracy, to the identified protruding corner parts. Thereby, the numerical control apparatus 1 can prevent burrs from occurring on the protruding corner parts when the workpiece W is machined by the machine tool 2.

Figure 3:
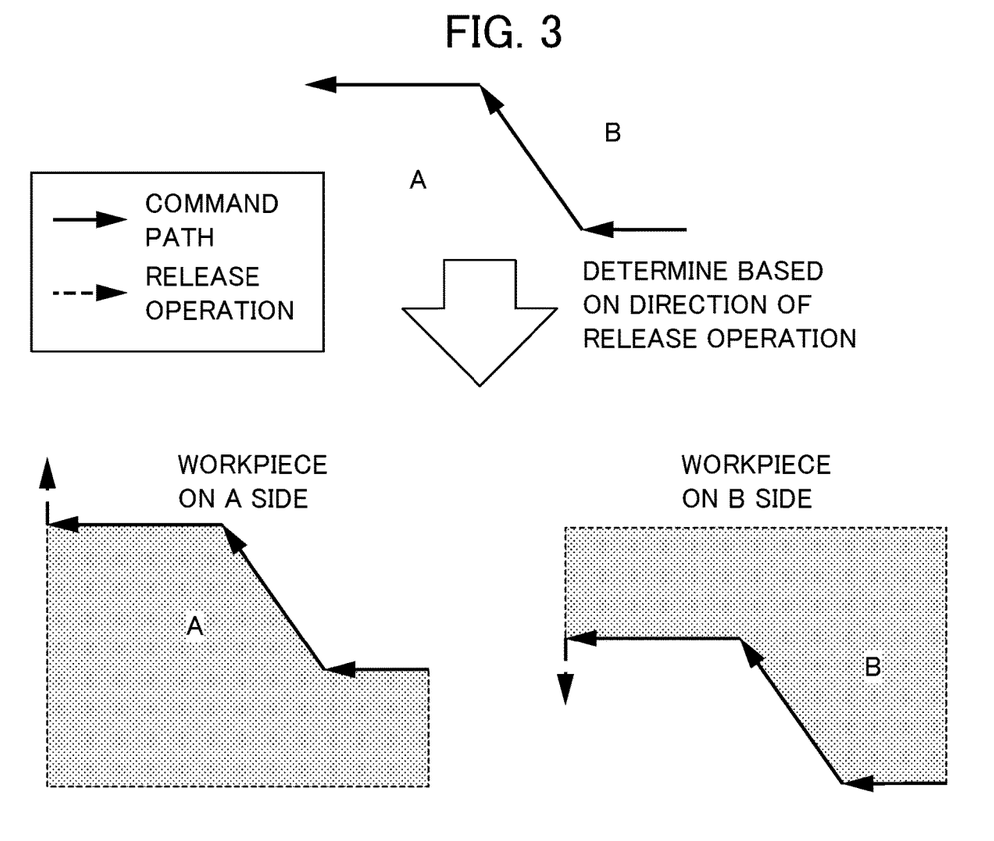
FIG. 3 is a diagram showing an example of a process for analyzing a positional relationship of a workpiece by the numerical control apparatus.
Figure 4:
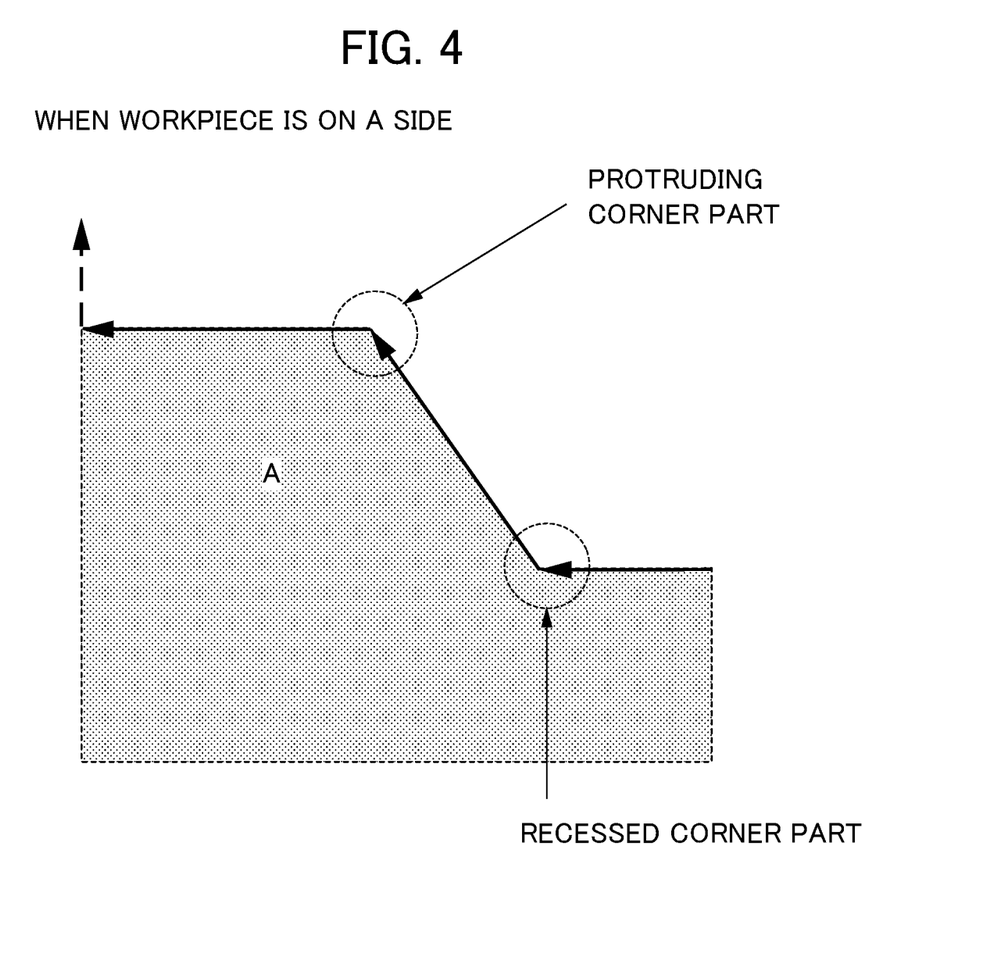
FIG. 4 is a diagram showing an example of a protruding corner part and a recessed corner part identified by the numerical control apparatus.

FIG. 3 is a diagram showing an example of a process for analyzing a positional relationship of a workpiece by the numerical control apparatus 1. FIG. 4 is a diagram showing an example of a protruding corner part and a recessed corner part identified by the numerical control apparatus 1. In the machining program 121, the analysis unit 111 analyzes a positional relationship of a workpiece in the machining program 121 based on a direction of a release operation of releasing a tool of the machine tool 2 from a cutting end position.

Specifically, as shown in FIG. 3, the analysis unit 111 determines which of a direction on an A side and a direction on a B side the direction of the release operation relative to a command path is, in the machining program 121. Then, if determining that the direction of the release operation is on the B side, the analysis unit 111 decides that the workpiece exists on the A side as the positional relationship of the workpiece.

If determining that the direction of the release operation is on the A side, the analysis unit 111 decides that the workpiece exists on the B side as the positional relationship of the workpiece. That is, the analysis unit 111 decides that the workpiece exists on the side opposite to the direction of the release operation.

Then, as shown in FIG. 4, the protruding corner part identification unit 112 identifies the protruding corner parts and recessed corner part of the workpiece based on the positional relationship of the workpiece in the machining program 121 and changes in movement directions of the program command path of the machining program 121.

Specifically, if it is decided that the workpiece exists on the A side as the positional relationship of the workpiece in the example shown in FIG. 3, the protruding corner part identification unit 112 identifies the protruding corner parts and recessed corner part of the workpiece based on the changes in the movement directions of the program command path of the machining program 121.

For example, in the example shown in FIG. 4, it is decided by the analysis unit 111 that the workpiece is on the A side as the positional relationship of the workpiece. Then, when the movement direction of the program command path changes, and an angle formed by the two movement directions before and after the change is below a first threshold (for example, 150°) on the workpiece side (the A side), the protruding corner part identification unit 112 identifies a position at which the movement direction has changed as a protruding corner part of the workpiece.

When the movement direction of the program command path changes, and an angle formed by the two movement directions before and after the change is equal to or greater than a second threshold (for example, 210°) on the workpiece side (the A side), the protruding corner part identification unit 112 identifies a position at which the movement direction has changed as a recessed corner part of the workpiece.

Identification of a protruding corner part and a recessed corner part of a workpiece is not limited to the above process, and other processes may be used.

Figure 5A:
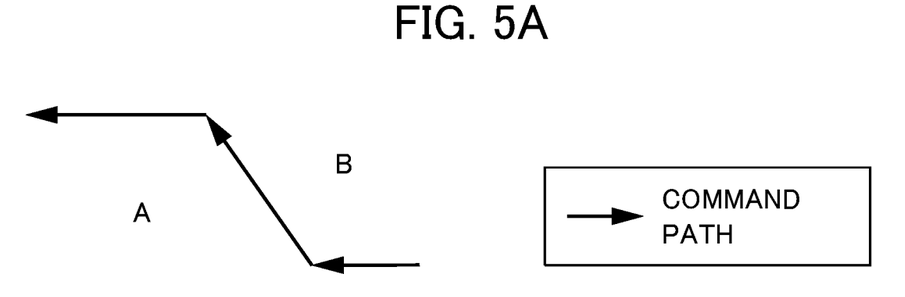
FIG. 5A is a diagram showing an example of a program command path of a machining program.
Figure 5B:
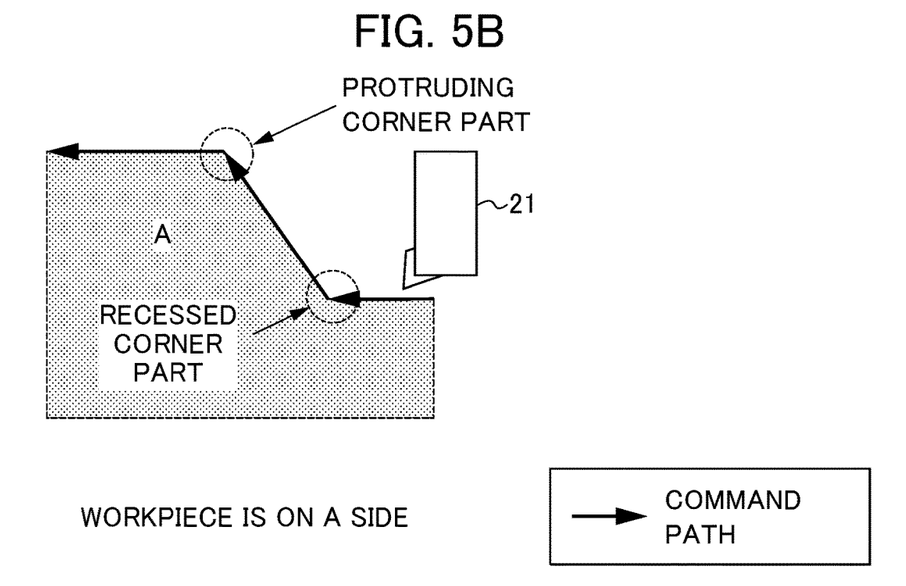
FIG. 5B is a diagram showing an example of a protruding corner part and a recessed corner part identified by the numerical control apparatus.
Figure 5C:
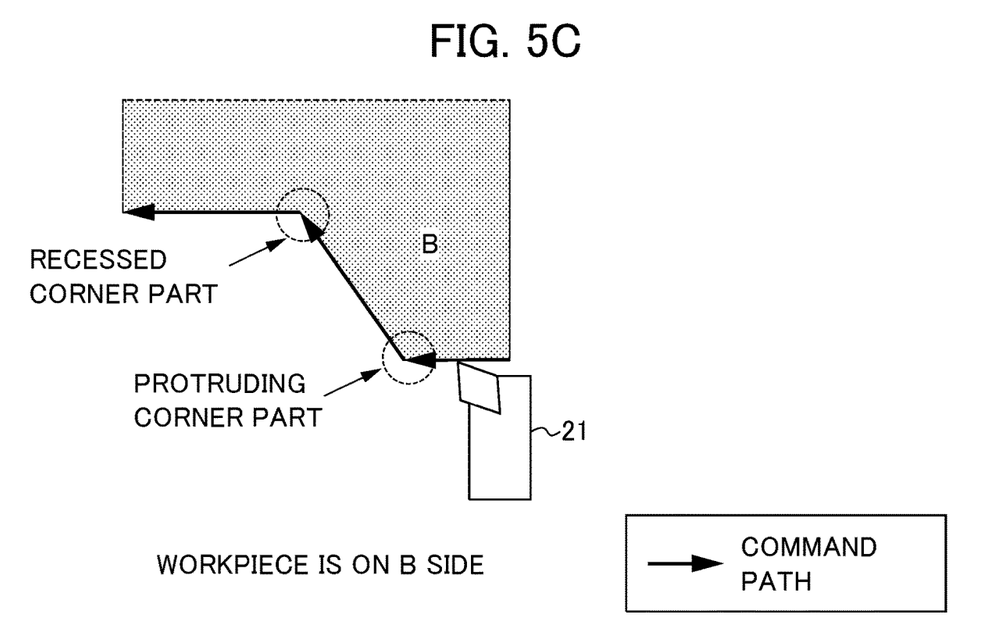
FIG. 5C is a diagram showing an example of a protruding corner part and a recessed corner part identified by the numerical control apparatus.

FIGS. 5A to 5C are diagrams showing another example of the process for identifying a protruding corner part. FIG. 5A is a diagram showing an example of a program command path of the machining program 121. FIGS. 5B and 5C are diagrams showing examples of a protruding corner part and a recessed corner part identified by the numerical control apparatus 1.

As shown in FIG. 5A, a workpiece to be machined by the machine tool 2 is arranged on any of the A side and the B side relative to the program command path of the machining program 121.

In the examples shown in FIGS. 5A to 5C, the analysis unit 111 analyzes a positional relationship of the workpiece in the machining program 121 based on the orientation of the tool 21 of the machine tool 2 and the machining program 121. Specifically, the analysis unit 111 decides which of the A side and B side the workpiece exists on as the positional relationship of the workpiece based on the machining program 121 and an orientation of a blade of the tool 21 in the tool data 122.

For example, as shown in FIG. 5B, if the blade of the tool 21 in the machining program 121 is oriented to the A side, the analysis unit 111 decides that the workpiece exists on the A side as the positional relationship of the workpiece.

As shown in FIG. 5C, if the blade of the tool 21 of the machining program 121 is oriented to the B side, the analysis unit 111 decides that the workpiece exists on the B side as the positional relationship of the workpiece.

Then, as shown in FIGS. 5B and 5C, the protruding corner part identification unit 112 identifies a protruding corner part and a recessed corner part of the workpiece based on the positional relationship of the workpiece in the machining program 121 and changes in movement directions of the program command path of the machining program 121.

Specifically, if it is decided that the workpiece exists on the A side as the positional relationship of the workpiece in the example shown in FIG. 5B, the protruding corner part identification unit 112 identifies the protruding corner part and recessed corner part of the workpiece based on the changes in the movement directions of the program command path of the machining program 121.

For example, in the example shown in FIG. 5B, it is decided by the analysis unit 111 that the workpiece is on the A side as the positional relationship of the workpiece. Then, when the movement direction of the program command path changes, and an angle formed by the two movement directions before and after the change is below the first threshold (for example, 150°) on the workpiece side (the A side), the protruding corner part identification unit 112 identifies a position at which the movement direction has changed as a protruding corner part of the workpiece.

When the movement direction of the program command path changes, and an angle formed by the two movement directions before and after the change is equal to or greater than the second threshold (for example, 210°) on the workpiece side (the A side), the protruding corner part identification unit 112 identifies a position at which the movement direction has changed as a recessed corner part of the workpiece.

On the other hand, if it is decided that the workpiece exists on the B side as the positional relationship of the workpiece in the example shown in FIG. 5C, the protruding corner part identification unit 112 identifies the protruding corner part and recessed corner part of the workpiece based on the changes in the movement directions of the program command path of the machining program 121.

For example, in the example shown in FIG. 5C, it is decided by the analysis unit 111 that the workpiece is on the B side as the positional relationship of the workpiece. Then, when the movement direction of the program command path changes, and an angle formed by the two movement directions before and after the change is below the first threshold (for example, 150°) on the workpiece side (the B side), the protruding corner part identification unit 112 identifies a position at which the movement direction has changed as a protruding corner part of the workpiece.

When the movement direction of the program command path changes, and an angle formed by the two movement directions before and after the change is equal to or greater than the second threshold (for example, 210°) on the workpiece side (the B side), the protruding corner part identification unit 112 identifies a position at which the movement direction has changed as a recessed corner part of the workpiece.

Figure 6A:
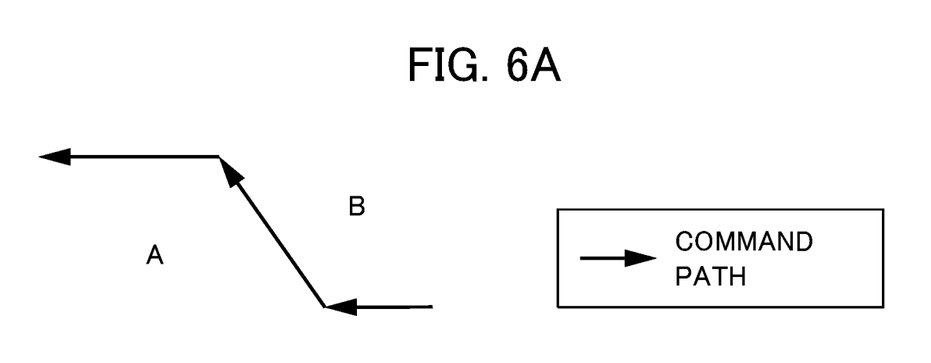
FIG. 6A is a diagram showing an example of the program command path of the machining program.
Figure 6B:
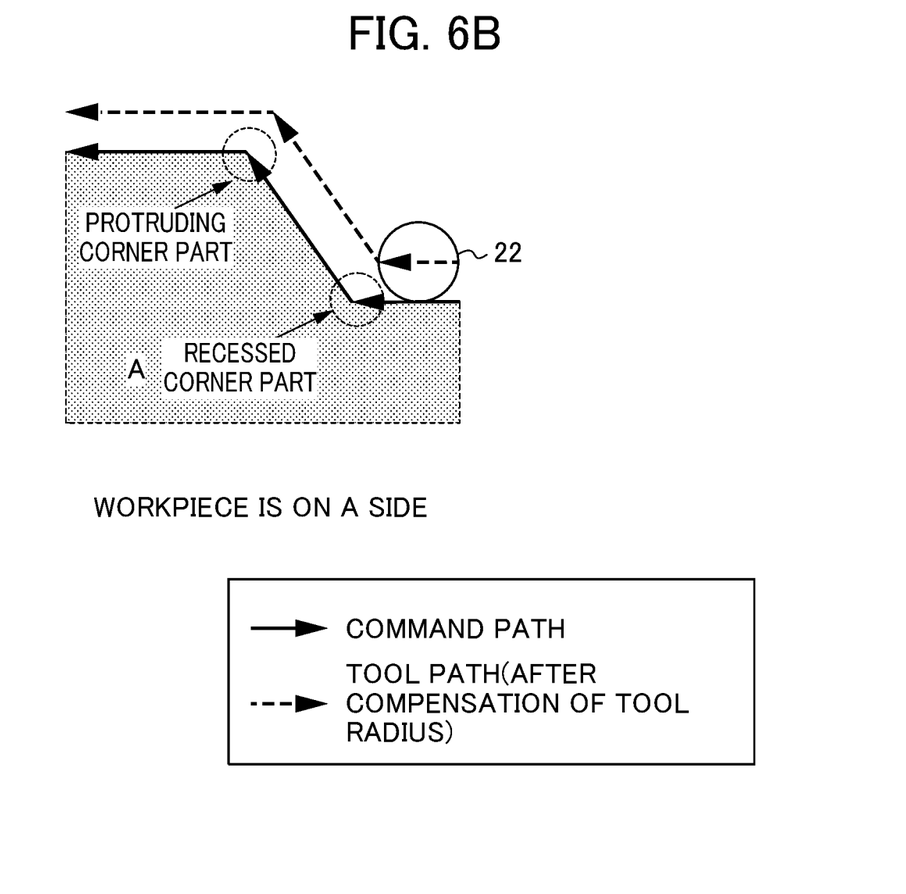
FIG. 6B is a diagram showing an example of a protruding corner part and a recessed corner part identified by the numerical control apparatus.
Figure 6C:
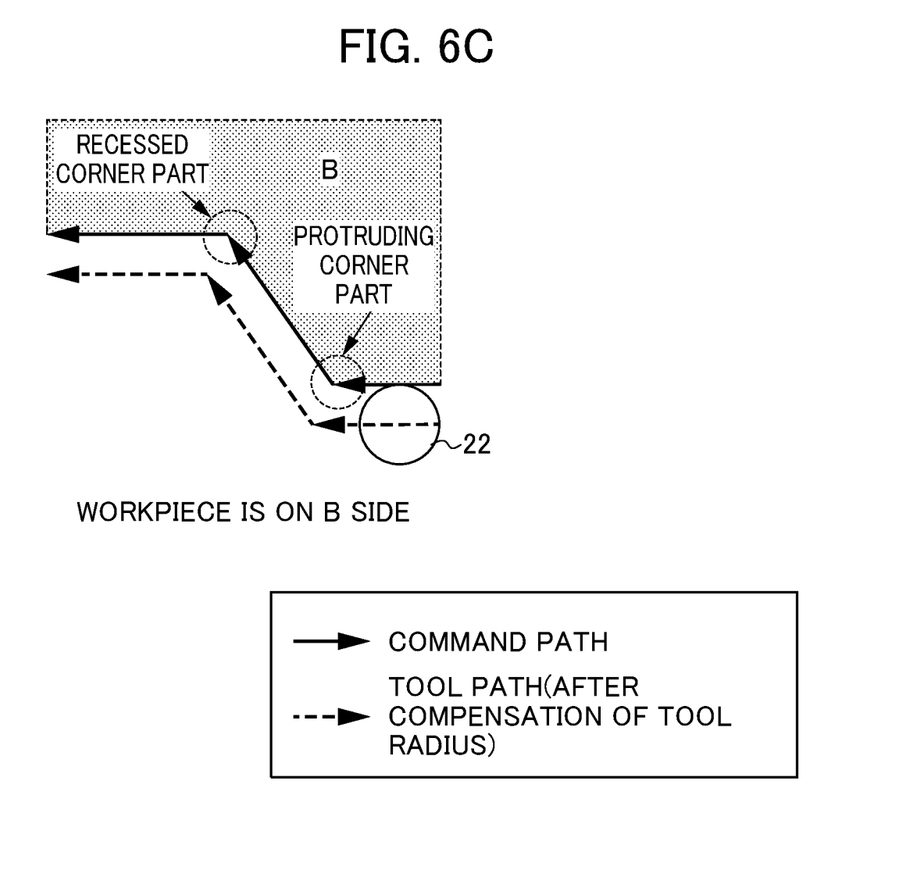
FIG. 6C is a diagram showing an example of a protruding corner part and a recessed corner part identified by the numerical control apparatus.

FIGS. 6A to 6C are diagrams showing another example of the process for identifying a protruding corner part. FIG. 6A is a diagram showing an example of the program command path of the machining program 121. FIGS. 6B and 6C are diagrams showing examples of a protruding corner part and a recessed corner part identified by the numerical control apparatus 1.

As shown in FIG. 6A, a workpiece to be machined by the machine tool 2 is arranged on any of the A side and the B side relative to the program command path of the machining program 121. In the examples shown in FIGS. 6A to 6C, the analysis unit 111 analyzes a positional relationship of the workpiece in the machining program 121 based on a direction of tool radius compensation for a tool 22 of the machine tool 2 and the machining program 121.

Specifically, the analysis unit 111 decides which of the A side and B side the workpiece exists on as the positional relationship of the workpiece based on the machining program 121 and the direction of tool radius compensation for the tool 22 of the tool data 122.

For example, as shown in FIG. 6B, if the direction of tool radius compensation for the tool 22 is on the B side, the analysis unit 111 decides that the workpiece exists on the A side as the positional relationship of the workpiece. Further, as shown in FIG. 6C, if the direction of tool radius compensation for the tool 22 is on the A side, the analysis unit 111 decides that the workpiece exists on the B side as the positional relationship of the workpiece. That is, the analysis unit 111 decides that the workpiece exists on the side opposite to the direction of tool radius compensation for the tool 22 relative to the command path of the machining program.

Then, as shown in FIGS. 6B and 6C, the protruding corner part identification unit 112 identifies a protruding corner part and a recessed corner part of the workpiece based on the positional relationship of the workpiece in the machining program 121 and changes in movement directions of the program command path of the machining program 121.

Specifically, if it is decided that the workpiece exists on the A side as the positional relationship of the workpiece in the example shown in FIG. 6B, the protruding corner part identification unit 112 identifies the protruding corner part and recessed corner part of the workpiece based on the changes in the movement directions of the program command path of the machining program 121.

For example, in the example shown in FIG. 6B, it is decided by the analysis unit 111 that the workpiece is on the A side as the positional relationship of the workpiece. Then, when the movement direction of the program command path changes, and an angle formed by the two movement directions before and after the change is below the first threshold (for example, 150°) on the workpiece side (the A side), the protruding corner part identification unit 112 identifies a position at which the movement direction has changed as a protruding corner part of the workpiece.

When the movement direction of the program command path changes, and an angle formed by the two movement directions before and after the change is equal to or greater than the second threshold (for example, 210°) on the workpiece side (the A side), the protruding corner part identification unit 112 identifies a position at which the movement direction has changed as a recessed corner part of the workpiece.

On the other hand, if it is decided that the workpiece exists on the B side as the positional relationship of the workpiece in the example shown in FIG. 6C, the protruding corner part identification unit 112 identifies the protruding corner part and recessed corner part of the workpiece based on the changes in the movement directions of the program command path of the machining program 121.

For example, in the example shown in FIG. 6C, it is decided by the analysis unit 111 that the workpiece is on the B side as the positional relationship of the workpiece. Then, when the movement direction of the program command path changes, and an angle formed by the two movement directions before and after the change is below the first threshold (for example, 150°) on the workpiece side (the B side), the protruding corner part identification unit 112 identifies a position at which the movement direction has changed as a protruding corner part of the workpiece.

When the movement direction of the program command path changes, and an angle formed by the two movement directions before and after the change is equal to or greater than the second threshold (for example, 210°) on the workpiece side (the B side), the protruding corner part identification unit 112 identifies a position at which the movement direction has changed as a recessed corner part of the workpiece.

Figure 7:
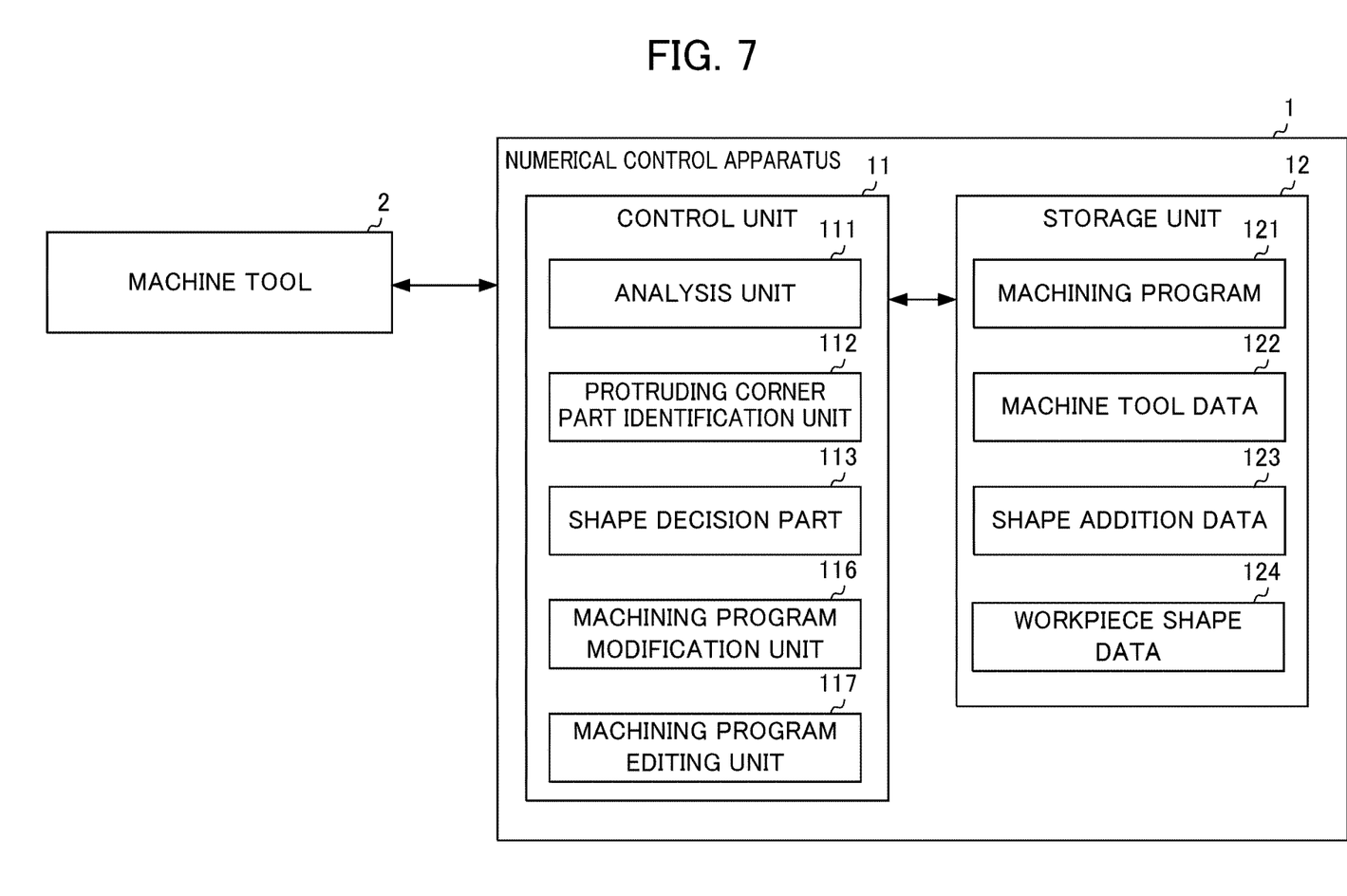
FIG. 7 is a diagram showing configurations of a numerical control apparatus and a machine tool according to another embodiment.

FIG. 7 is a diagram showing configurations of the numerical control apparatus 1 and the machine tool 2 according to another embodiment. In the description of the embodiment shown in FIG. 7, the same components as the embodiment shown in FIG. 1 are given the same reference numerals, and description thereof will be omitted or simplified.

The embodiment shown in FIG. 7 is different from the embodiment shown in FIG. 1 mainly in that a machining program modification unit 116 and a machining program editing unit 117 are provided instead of the shape addition unit 114 and the interpolation processing unit 115. Other components of the embodiment shown in FIG. 7 are similar to those of the embodiment shown in FIG. 1.

The machining program modification unit 116 modifies the machining program 121 to machine a protruding corner part identified by the protruding corner part identification unit 112 in a curved shape. Specifically, the machining program modification unit 116 modifies the machining program 121 by adding a program command path for machining the protruding corner part identified by the protruding corner part identification unit 112 in a curved shape, to the machining program.

The machining program editing unit 117 edits the modified machining program 121. Specifically, the machining program editing unit 117 draws a program command path of the modified machining program 121 on a display unit (not shown). Further, the machining program editing unit 117 performs confirmation and modification of the position where the curved shape has been added, in the modified machining program 121 according to operations of the numerical control apparatus 1 by an operator.

Thus, in the embodiment shown in FIG. 7, it is possible to, by modifying the machining program 121 by the machining program modification unit 116, machine a protruding corner part identified by the protruding corner part identification unit 112 in a curved shape.

The shape decision unit 113 decides, for a protruding corner part identified by the protruding corner part identification unit 112, a size of a curved shape to be added by the shape addition unit 114 and the machining program modification unit 116. Specifically, the shape decision unit 113 reads out the added shape data 123 or the workpiece shape data 124 from the storage unit 12. Here, the added shape data 123 may be, for example, data in which the size of the curved shape is set. The workpiece shape data 124 may be, for example, drawing data (CAD (computer-aided design) data) for machining the workpiece, and the size of the curved shape is decided to fit to the shape accuracy described in the drawing data.

As described above, the shape decision unit 113 decides the size of the curved shape to be added to the protruding corner part identified by the protruding corner part identification unit 112, based on the added shape data 123 or the workpiece shape data 124 that has been read out. The curved shape to be added is, for example, an R shape.

As described above, according to the present embodiment, the numerical control apparatus 1 is provided with the analysis unit 111 that analyzes the machining program 121 for machining a workpiece by the machine tool 2 and the protruding corner part identification unit 112 that identifies a protruding corner part that causes burrs to occur on the workpiece, based on the analyzed machining program 121. Thereby, the numerical control apparatus 1 can identify a protruding corner part that causes burrs to occur on a workpiece. Therefore, the numerical control apparatus 1 can easily prevent occurrence of burrs by machining the identified protruding corner part in a curved shape.

The numerical control apparatus 1 is further provided with the shape addition unit 114 that adds a curvilinear path to a protruding corner part identified by the protruding corner part identification unit 112. Thereby, the numerical control apparatus 1 can easily prevent occurrence of burrs by adding the curvilinear path to the identified protruding corner part.

The numerical control apparatus is further provided with the interpolation processing unit 115 that performs interpolation based on a path obtained by adding a curvilinear path to a command path of the machining program 121 by the shape addition unit 114. Thereby, the numerical control apparatus 1 can cause the machine tool 2 to operate on the path to which the curvilinear path is added to machine a workpiece.

In the machining program 121, the analysis unit 111 analyzes a positional relationship of a workpiece in the machining program 121 based on a direction of a release operation of releasing a tool of the machine tool 2 from a cutting end position. The protruding corner part identification unit 112 identifies a protruding corner part based on the positional relationship of the workpiece in the machining program 121 and a change in a movement direction of a program command path of the machining program 121. Thereby, the numerical control apparatus 1 can appropriately identify the protruding corner part of the workpiece from the machining program 121.

The analysis unit 111 analyzes a positional relationship of a workpiece in the machining program 121 based on an orientation of the tool 21 of the machine tool 2 and the machining program 121. The protruding corner part identification unit 112 identifies a protruding corner part based on the positional relationship of the workpiece in the machining program 121 and a change in a movement direction of a program command path of the machining program 121. Thereby, the numerical control apparatus 1 can appropriately identify the protruding corner part of the workpiece from the machining program 121.

Further, the analysis unit 111 analyzes a positional relationship of a workpiece in the machining program 121 based on a direction of tool radius compensation for the tool 22 of the machine tool 2 and the machining program 121. The protruding corner part identification unit 112 identifies a protruding corner part based on the positional relationship of the workpiece in the machining program 121 and a change in a movement direction of a program command path of the machining program. Thereby, the numerical control apparatus 1 can appropriately identify the protruding corner part of the workpiece from the machining program 121.

The numerical control apparatus 1 is further provided with the machining program modification unit 116 that modifies the machining program 121 to machine a protruding corner part identified by the protruding corner part identification unit 112 in a curved shape. Thereby, by modifying the machining program 121, the machine tool 2 can machine the protruding corner part identified by the protruding corner part identification unit 112 in a curved shape.

The numerical control apparatus 1 is provided with the machining program editing unit 117 that confirms and modifies a program command path of the machining program 121 modified by the machining program modification unit 116. Thereby, it is possible for an operator to confirm and modify the machining program 121 modified by the machining program modification unit 116.

The numerical control apparatus 1 is further provided with the shape decision unit 113 that decides a size of a curved shape to be added to a protruding corner part identified by the protruding corner part identification unit 112. Thereby, the numerical control apparatus 1 can decide a size of the curved shape of the protruding corner part to be an appropriate value.

The embodiments of the present invention have been described above. The numerical control apparatus 1 described above can be realized by hardware, software or a combination thereof. Further, a control method implemented by the numerical control apparatus 1 described above can also be realized by hardware, software or a combination thereof. Here, being realized by software means being realized by a computer reading and executing a program.

The program can be supplied to the computer by being stored in any of various types of non-transitory computer-readable media. The non-transitory computer-readable media include various types of tangible storage media.

Examples of the non-transitory computer-readable media include a magnetic recording medium (for example, a hard disk drive), a magneto-optical recording medium (for example, a magneto-optical disk), a CD-ROM (read-only memory), a CD-R, a CD-R/W, a semiconductor memory (for example, a mask ROM and a PROM (programmable ROM), an EPROM (Erasable PROM), a flash ROM and a RAM (random access memory).

Though the embodiments described above are preferred embodiments of the present invention, the scope of the present invention is not limited only to the embodiments. The embodiments can be implemented in a form in which various changes are made in a range not departing from the spirit of the present invention.

EXPLANATION OF REFERENCE NUMERALS

1 Numerical control apparatus
2 Machine tool
11 Control unit
12 Storage unit
111 Analysis unit
112 Protruding corner part identification unit
113 Shape decision unit
114 Shape addition unit
115 Interpolation processing unit
116 Machining program modification unit
117 Machining program editing unit

The invention claimed is:

1. A numerical control apparatus for controlling a machine tool that machines a workpiece, comprising:
a processor,
wherein the processor is configured to:
analyze a machining program for machining the workpiece in the machine tool;
identify a protruding corner part that causes burrs to occur on the workpiece, based on the analyzed machining program;
analyze a positional relationship of the workpiece in the machining program based on a direction of a release operation of releasing a tool of the machine tool from a cutting end position, in the machining program;
identify the protruding corner part based on the positional relationship of the workpiece in the machining program and a change in a movement direction of a program command path of the machining program;
modify the machining program to machine the protruding corner part in a curved shape; and
control the machine tool to machine the workpiece based on the modified machining program.

2. The numerical control apparatus according to claim 1, wherein the processor adds a curvilinear path to the protruding corner part.

3. The numerical control apparatus according to claim 2, wherein the processor decides a size of the curved shape.

4. The numerical control apparatus according to claim 1, wherein the processor performs confirmation and modification of the machining program.

5. A numerical control apparatus for controlling a machine tool that machines a workpiece, comprising:
a processor,
wherein the processor is configured to:
analyze a machining program for machining the workpiece in the machine tool;
identify a protruding corner part that causes burrs to occur on the workpiece, based on the analyzed machining program;
analyze a positional relationship of the workpiece in the machining program based on an orientation of a tool of the machine tool and the machining program;
identify the protruding corner part based on the positional relationship of the workpiece in the machining program and a change in a movement direction of a program command path of the machining program;
modify the machining program to machine the protruding corner part in a curved shape; and
control the machine tool to machine the workpiece based on the modified machining program.

6. A numerical control apparatus for controlling a machine tool that machines a workpiece, comprising:
a processor,
wherein the processor is configured to:
analyze a machining program for machining the workpiece in the machine tool;
identify a protruding corner part that causes burrs to occur on the workpiece, based on the analyzed machining program;
analyze a positional relationship of the workpiece in the machining program based on a direction of tool radius compensation for a tool of the machine tool and the machining program;
identify the protruding corner part based on the positional relationship of the workpiece in the machining program and a change in a movement direction of a program command path of the machining program;
modify the machining program to machine the protruding corner part in a curved shape; and
control the machine tool to machine the workpiece based on the modified machining program.

* * * * *